Nov. 1, 1949.  A. R. MILLER  2,486,668
AUTOMATIC SEQUENTIALLY OPERATED WASHING MACHINE
Filed April 8, 1943  10 Sheets-Sheet 1
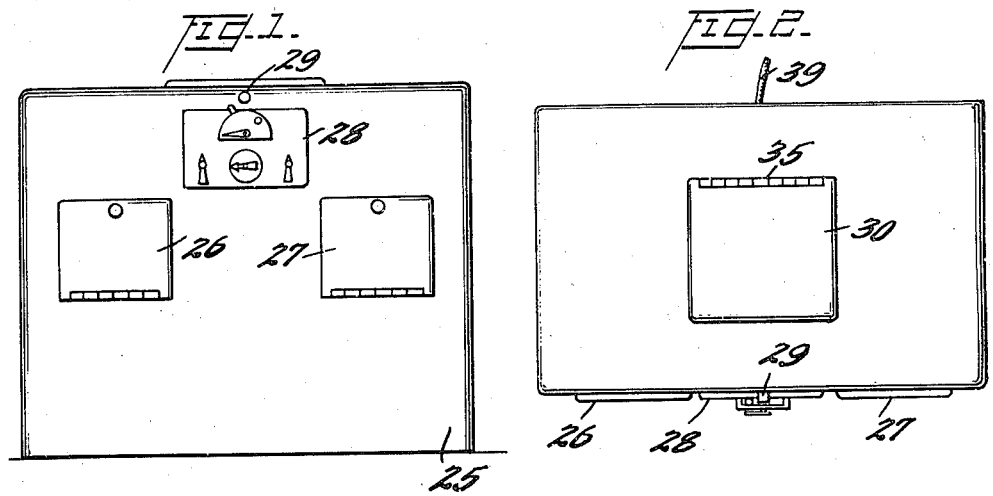
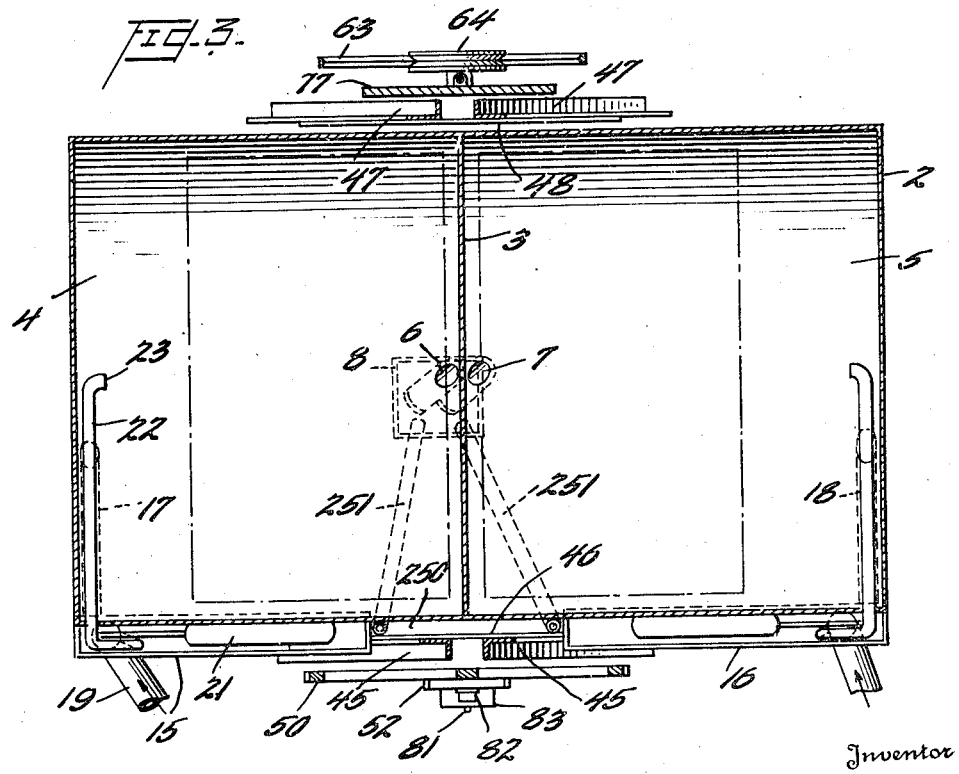
Inventor
A. R. Miller
By
Attorney

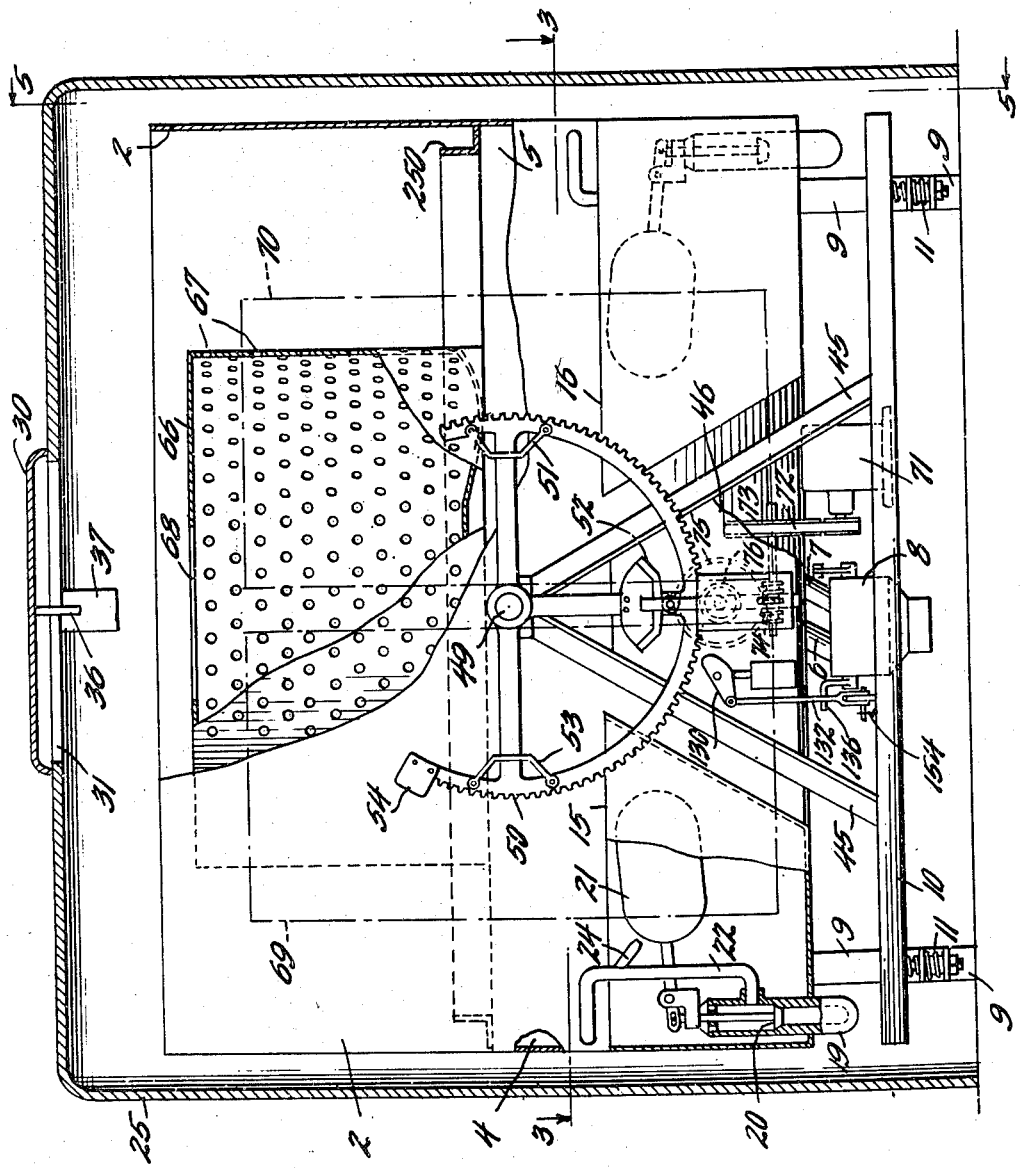

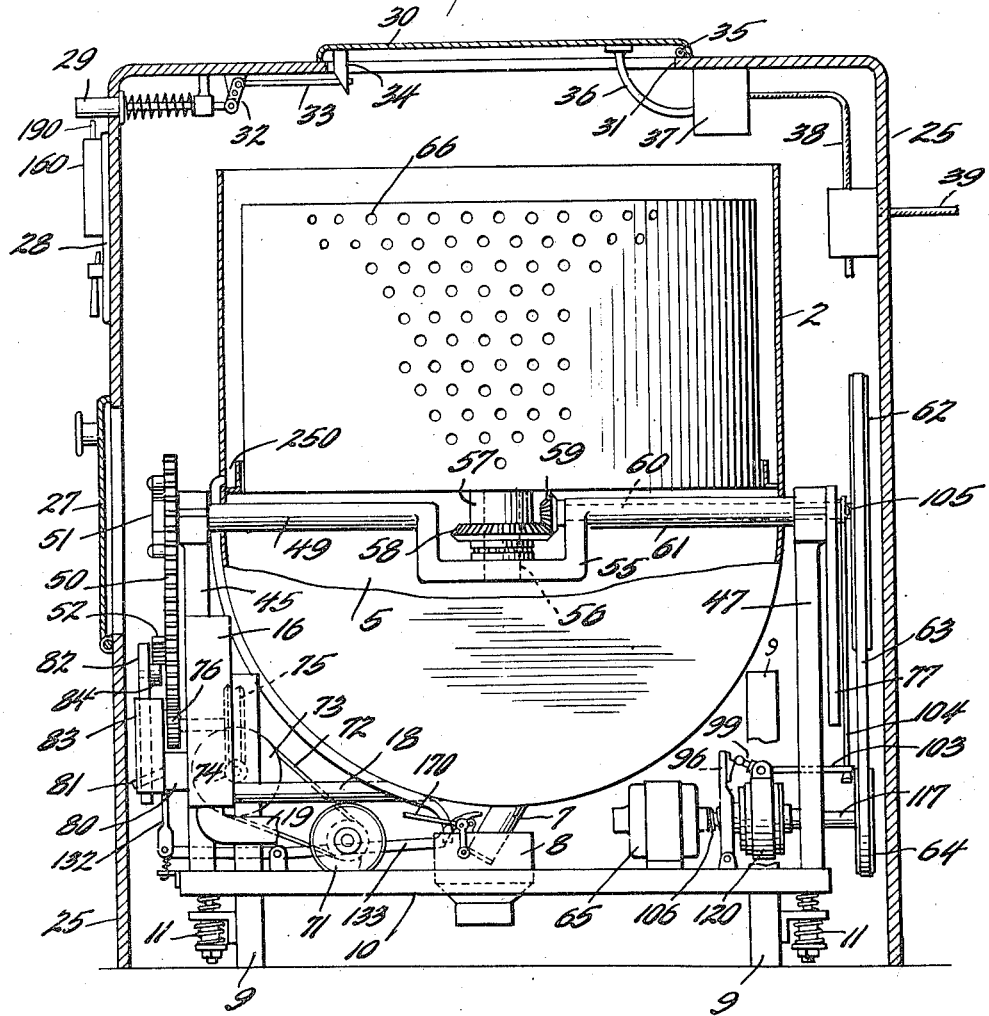

Nov. 1, 1949.    A. R. MILLER    2,486,668
AUTOMATIC SEQUENTIALLY OPERATED WASHING MACHINE
Filed April 8, 1943    10 Sheets-Sheet 4
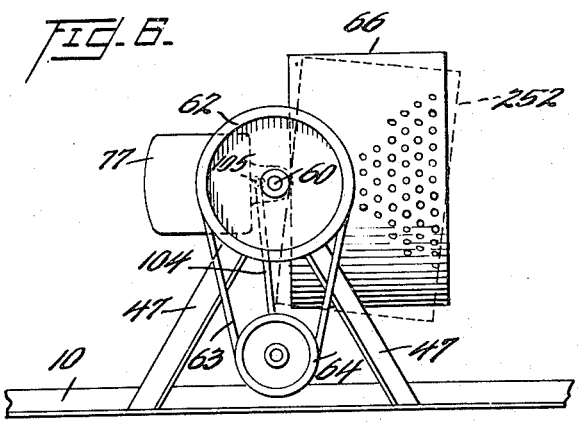
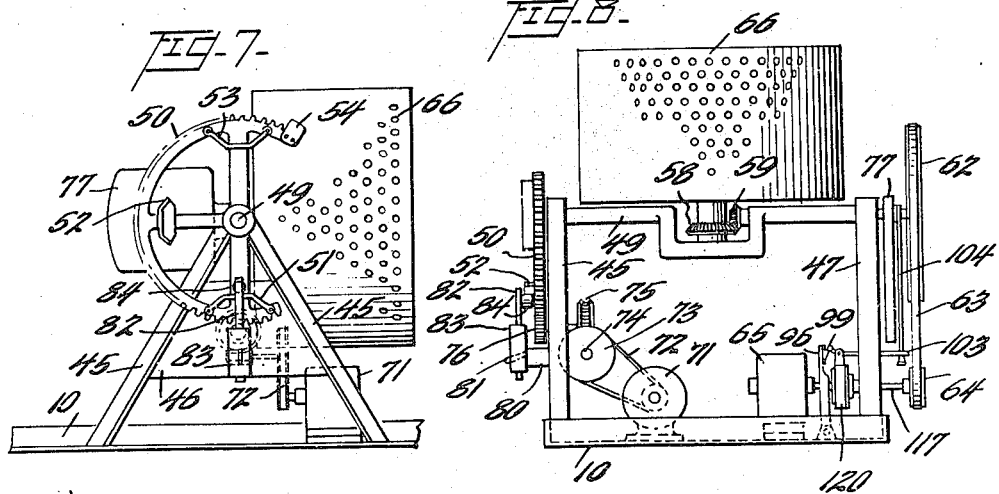
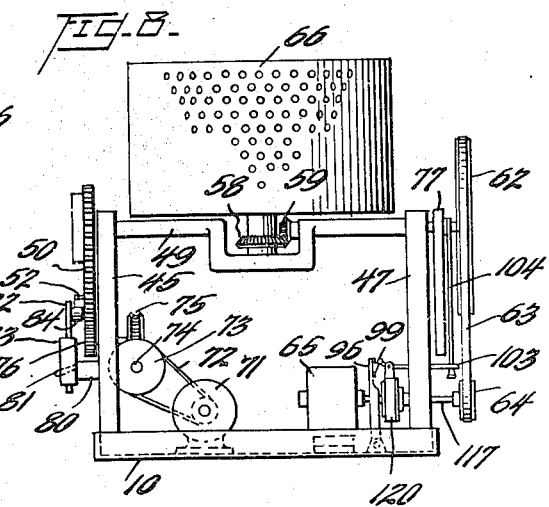
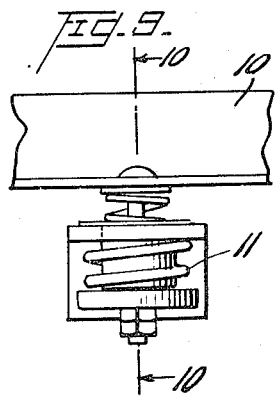
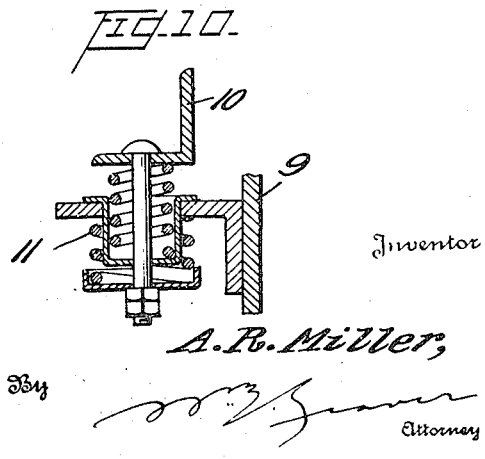

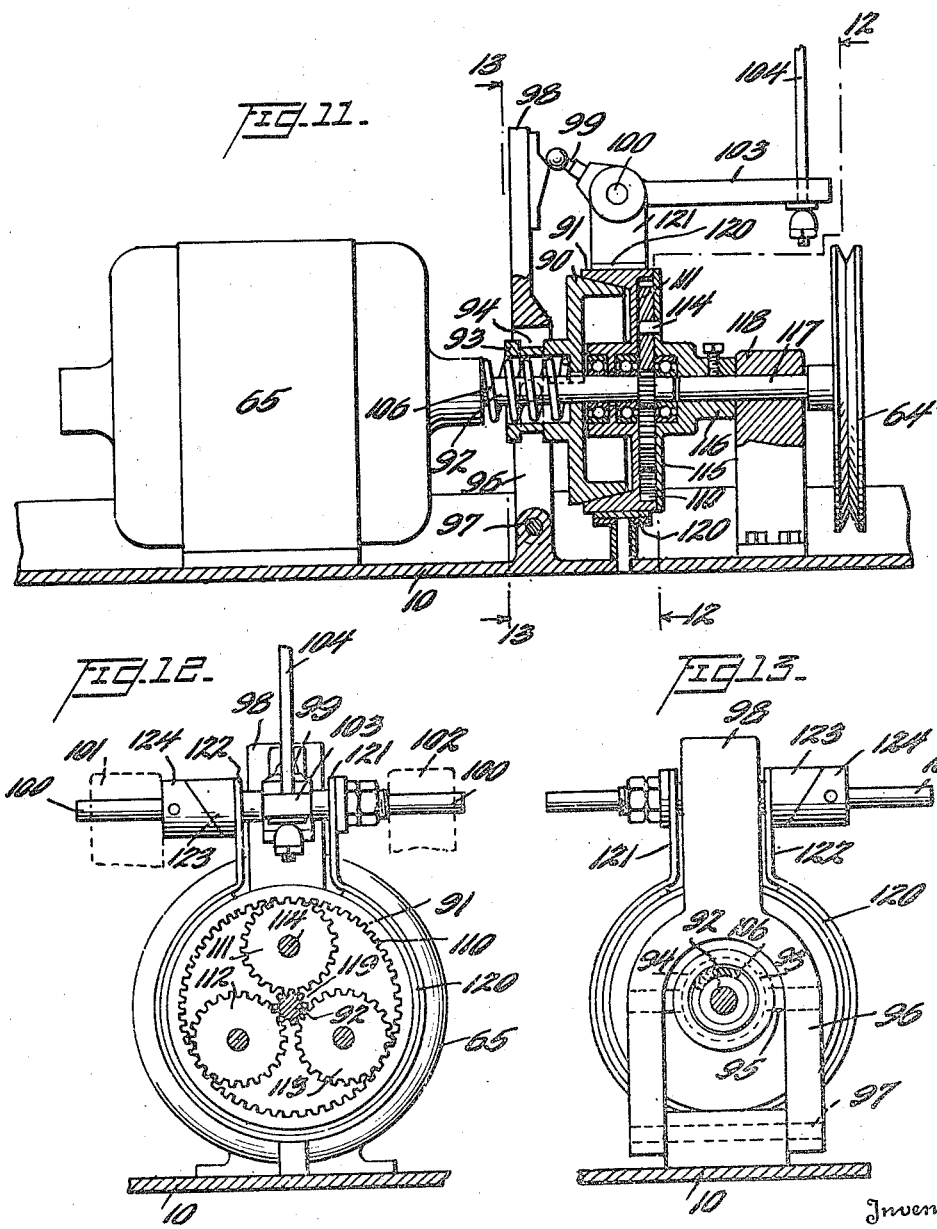

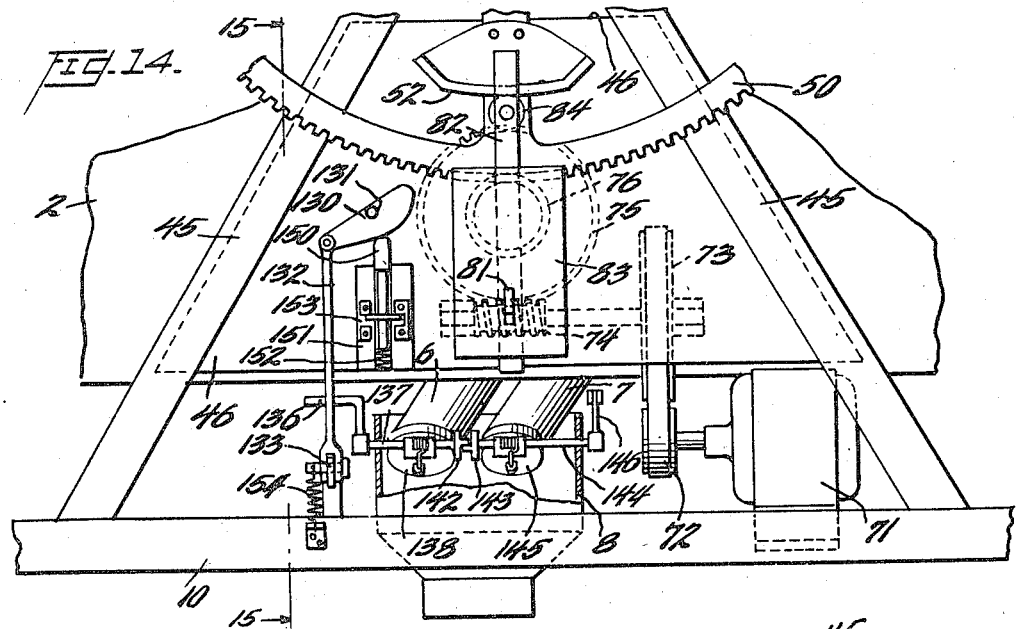
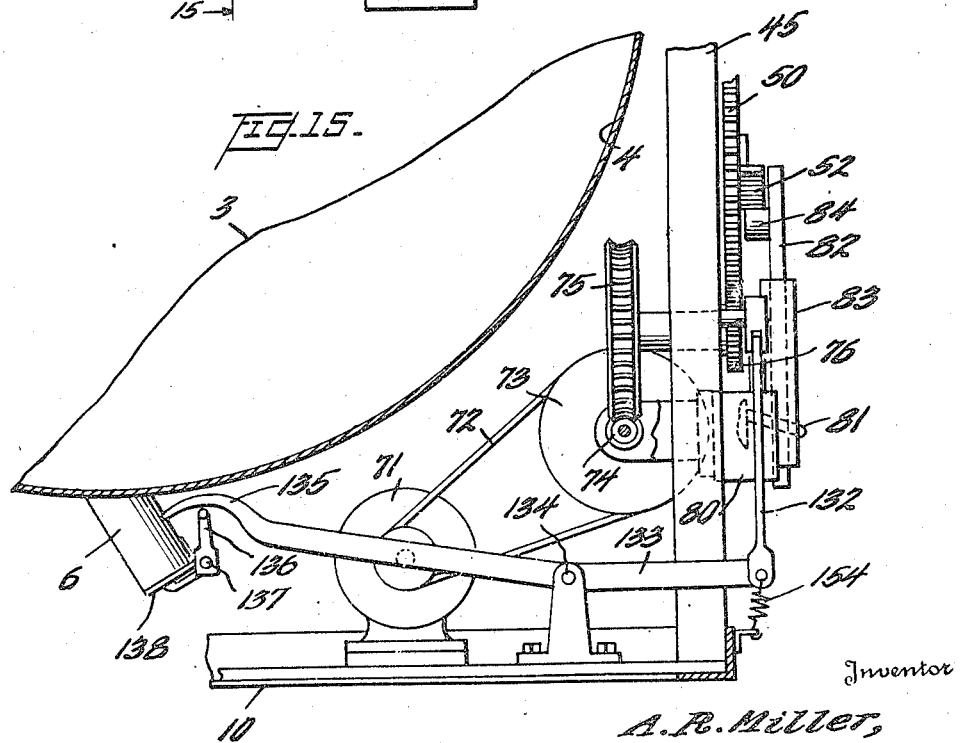

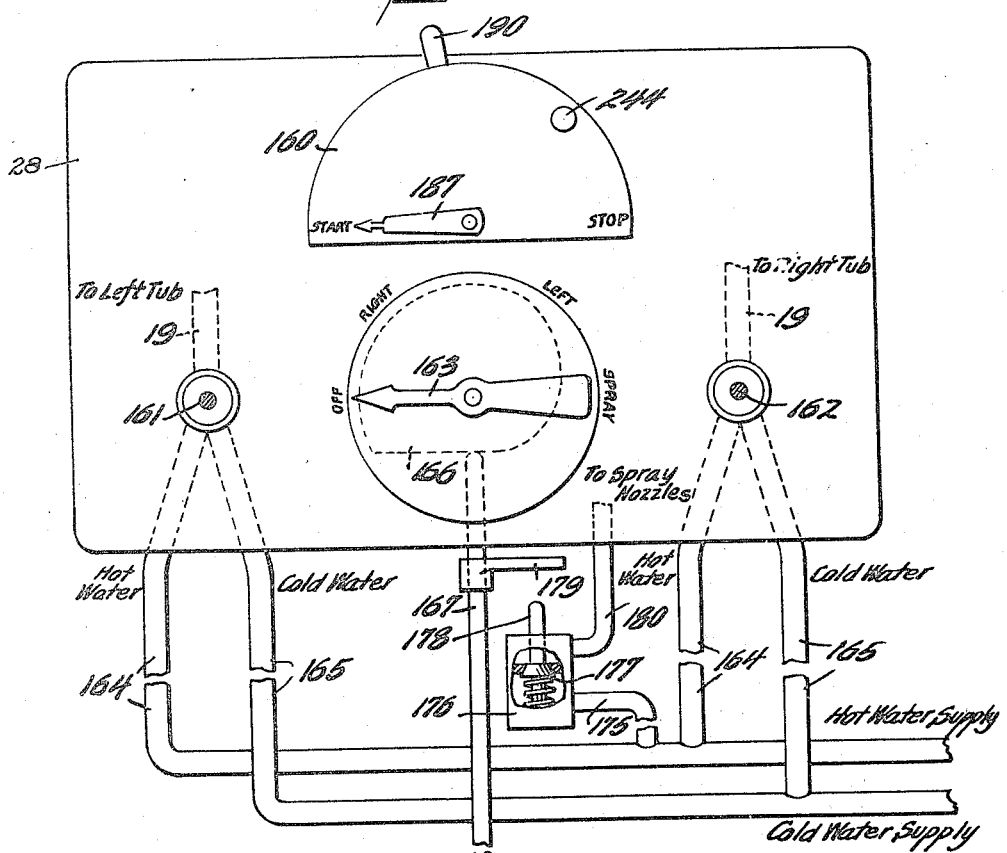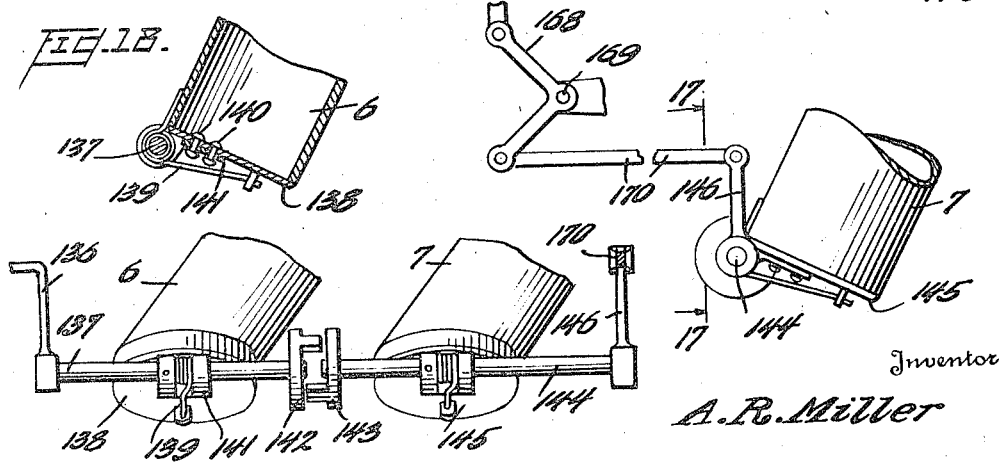

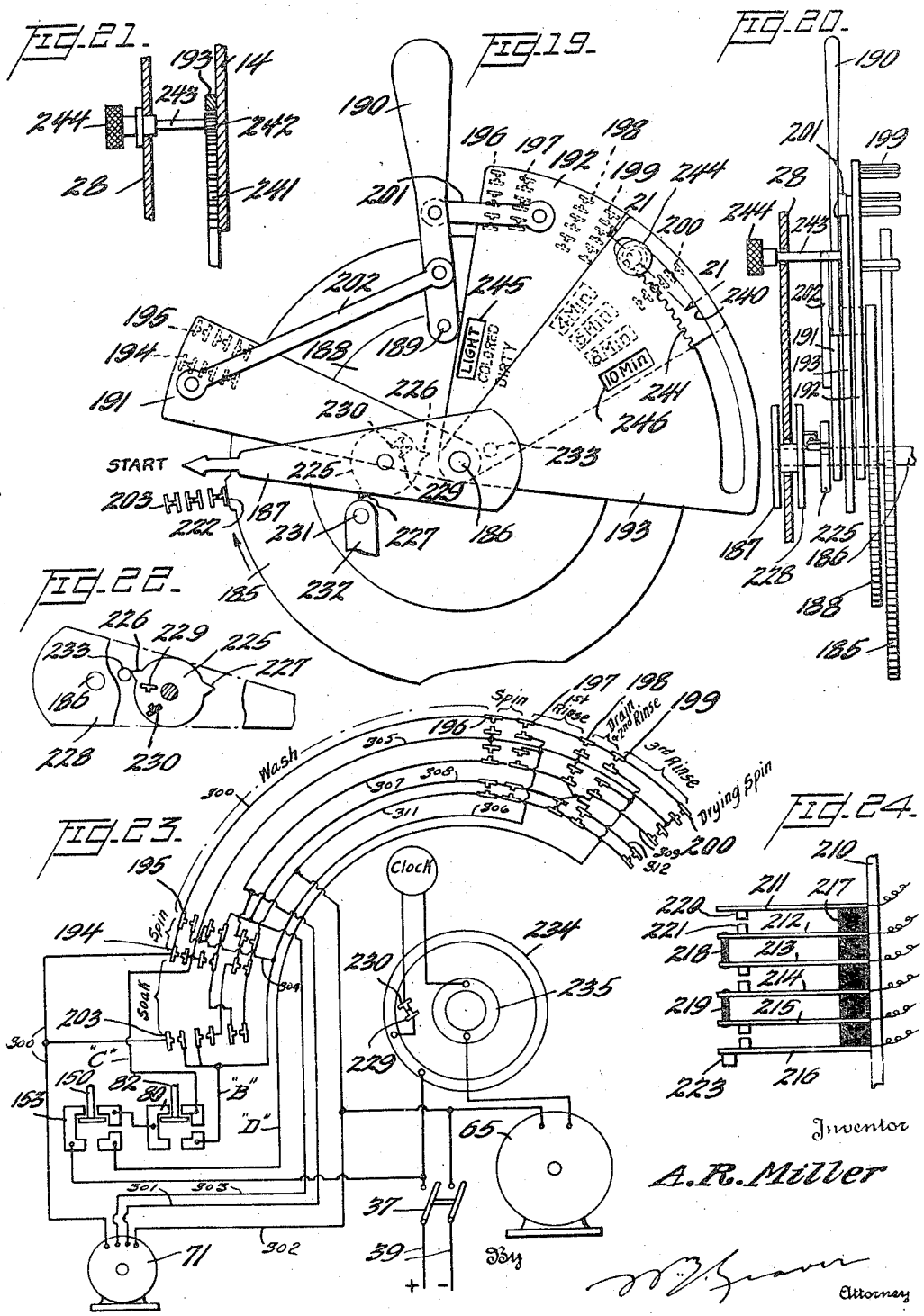

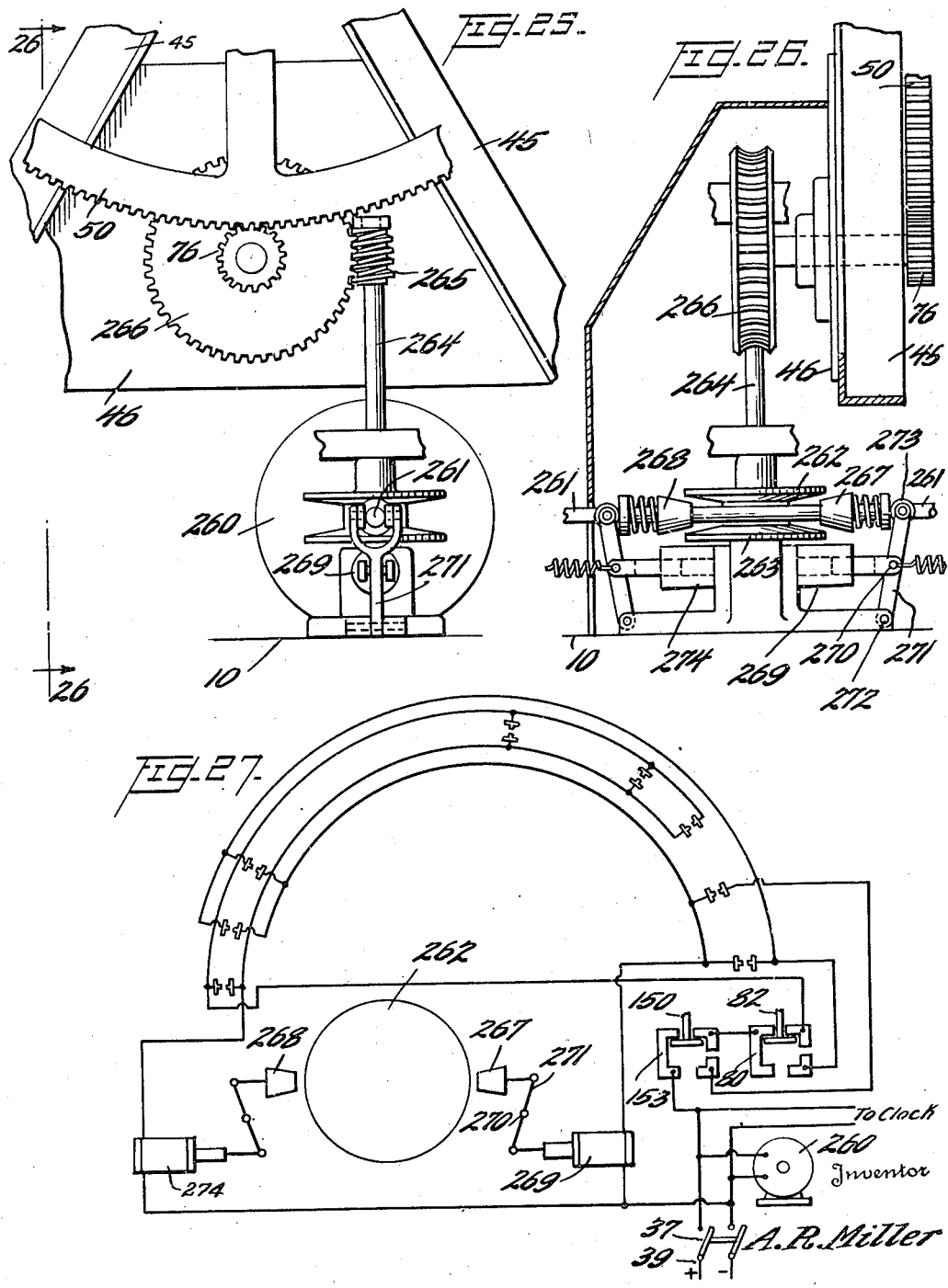

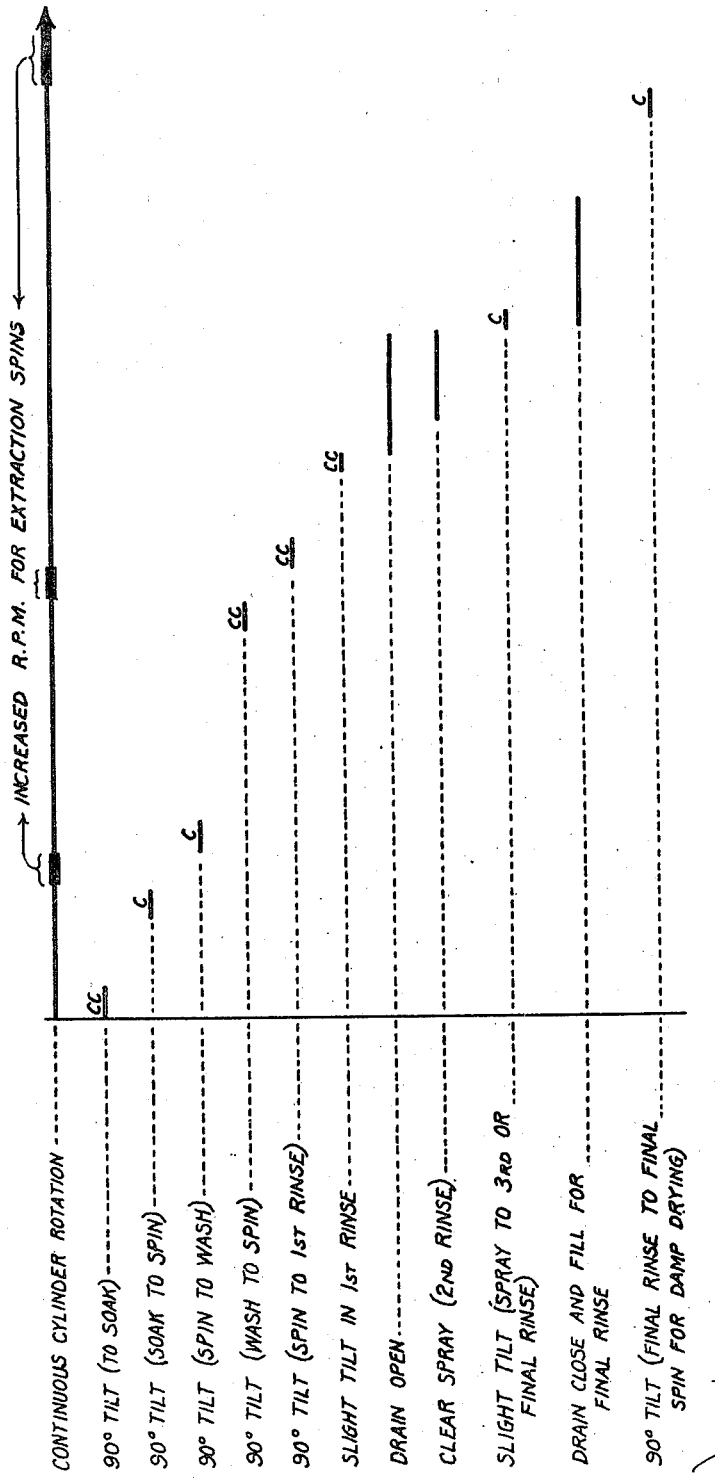

Patented Nov. 1, 1949

2,486,668

UNITED STATES PATENT OFFICE 2,486,668

AUTOMATIC SEQUENTIALLY OPERATED WASHING MACHINE

Albert R. Miller, Hialeah, Fla.

Application April 8, 1943, Serial No. 482,292

6 Claims. (Cl. 68—10)

This invention relates to washing machines used for laundering clothes, and more particularly to machines of this type which are automatic in their operation, having for its object to provide an apparatus which is more efficient in operation and execution than those heretofore proposed.

With these and other objects in view, the invention resides in the novel details of construction and combinations of parts as will be disclosed more fully hereinafter and particularly covered by the claims.

Referring to the accompanying drawings forming a part of this specification, and in which like numerals designate like parts in all the views—

Fig. 1 is a front elevational view of the cabinet or casing enclosing the washing apparatus;

Fig. 2 is a top plan view of the parts shown in Fig. 1;

Fig. 3 is a horizontal sectional view of the machine taken as on the line 3—3 of Fig. 4 and looking in the direction of the arrows, the cabinet or casing not being shown for clearness of illustration;

Fig. 4 is a front elevational view, partly in section, of the parts shown in Fig. 3;

Fig. 5 is an enlarged view, partly in section and partly in elevation, of the parts shown in Fig. 4 as seen substantially on the line 5—5 of that figure and looking in the direction of the arrows;

Fig. 6 is a detail view of the cylinder and its support, said cylinder being represented in one of its positions during the operation of the machine;

Fig. 7 is another detail view of the cylinder and its support, said cylinder being represented in another of its positions during the operation of the machine, this view being at substantially 180° to that of Fig. 6;

Fig. 8 is a detail view of the cylinder and its support, said cylinder being represented in still another of its positions during the operation of the machine, the cylinder in this view occupying a position intermediate of those positions shown in Figs. 6 and 7;

Fig. 9 is a detail view in elevation of one of the yieldable connections between the cylinder support and the tub support of the machine;

Fig. 10 is a vertical sectional view taken as on the line 10—10 of Fig. 9 and looking in the direction of the arrows;

Fig. 11 is a detail view, partly in section and partly in elevation, illustrating the motor drive, and its control, for the rotation of the clothes cylinder at different speeds;

Fig. 12 is a vertical sectional view of the parts shown in Fig. 11, taken as on the line 12—12 of said figure and looking in the direction of the arrows;

Fig. 13 is a vertical sectional view of the parts shown in Fig. 11 and taken as on the line 13—13 of said figure and looking in the direction of the arrows;

Fig. 14 is a detail view of some of the parts shown in Fig. 4, on an enlarged scale to better illustrate the arrangement and operation thereof;

Fig. 15 is a detail view of some of the parts shown in Fig. 14, taken substantially on the line 15—15 of said figure and looking in the direction of the arrows;

Fig. 16 is a more or less schematic view illustrating the water supply piping, the tub drain valve, connections therebetween, and the control thereof from the panel board of the machine;

Fig. 17 is a detail view of a portion of the control of the tub drain valves, taken as on the line 17—17 of Fig. 16 and looking in the direction of the arrows;

Fig. 18 is a detail view partly in section of a tub drain valve;

Fig. 19 is a more or less schematic view of a portion of the clock motor for controlling the electric circuits of the machine, and the manual adjustment provided for varying the time intervals between the closing of certain electric circuit contacts in accordance with the time desired to be alloted for certain operations in the laundering of the clothes;

Fig. 20 is a more or less schematic view of the parts illustrated in Fig. 19 and as seen from the right side of said figure;

Fig. 21 is a detail sectional view taken as on the line 21—21 of Fig. 19 and looking in the direction of the arrows;

Fig. 22 is a detail view illustrating a portion of the pointer shown in Fig. 19 in a position substantially 180° from that shown in said figure;

Fig. 23 is a wiring diagram of the electric circuits controlling the operation of the machine;

Fig. 24 is a detail elevational view of one of the sets of electric contacts shown in Figs. 19 and 23;

Fig. 25 is a view similar to Fig. 14 but illustrating a modification of the drive for tilting the cylinder;

Fig. 26 is a view of the parts shown in Fig. 25 taken as on the line 26—26 thereof and looking in the direction of the arrows;

Fig. 27 is a wiring diagram of the electric circuits controlling the operation of the machine when utilizing the modification of construction illustrated in Figs. 25 and 26; and Fig 28 is a chart illustrating the sequence of operation of the tilting motor, the cylinder rotating motor, the drain valves, and the sprays.

General description of machine

This machine comprises a receptacle generally identified by the numeral 2 which is divided transversely by a substantially vertical partition 3 to form two open top tanks or tubs of equal or different capacities as desired, the tub 4 serving as the soak and rinse tub, and the tub 5 serving as the wash tub, the bottoms of these two tubs preferably being of circular formation as shown in Fig. 5 to faciiltate draining of the water therefrom as through the respective drain pipes 6 and 7 into a funnel-like collector 8 adapted to communicate with any suitable medium by which the drained water may be removed from the machine. The receptacle 2 is supported in any convenient manner upon a suitable rigid framework including legs such as 9 contacting the floor. Horizontally disposed supporting bars constitute an auxiliary frame indicated at 10, which frame is yieldably carried by the receptacle-supporting framework, the yieldability achieved in any appropriate manner well known in the arts and such as the springs 11, the purpose being to mount the moving or vibratory parts of the machine upon the auxiliary frame so as to reduce to a minimum the vibrations thereof reaching the floor or the outer casing. The yieldable mounting presently disclosed forms the subject matter of my divisional application Serial No. 592,894, filed May 9, 1945, and issued November 19, 1946, as U. S. Patent 2,411,383.

Associated with each of the tubs 4 and 5, but exterior thereof and supported thereby and/or by said framework, are duplicate float-valve boxes indicated at 15 and 16, each in open communication with its respective tub as by the pipes 17 and 18. The box 15 is connected to a source of water supply as by the pipe 19 which extends upwardly into said box and is provided with the usual valve indicated at 20 which valve is controlled by the float 21 in accordance with well known practices and according to the water level desired. Above the valve 20 the pipe 19 is provided with a lateral branch 22 leading upwardly and around the side of the tub 4 and terminating in a substantial nozzle-like orifice 23 disposed substantially centrally of said tub (see Figs. 3 and 4). This lateral branch may be provided with a test nipple such as 24 discharging into the float valve box 15 and disposed conveniently to access by the operator's hand so that the temperature of the water admitted to the tub may be tested. The other float-valve box 16 is similarly constructed and has a duplication of the parts just above described in connection with box 15. An ornamental housing generally identified by the numeral 25 is provided to encase the entire machine, and in the front wall of said housing there are duplicate doors 26 and 27 so located as to give access to the float-valve boxes and to make possible the manual testing of the temperature of the water flowing from the test nipples.

On said front wall of the housing there is mounted a control panel generally identified by the numeral 28 and to be described more fully hereinafter, and a handle or other latch operating device 29 is provided for controlling the release of the spring tensioned cover 30 on the top of said casing, said cover disposed over the opening 31 through which clothes are admitted to and abstracted from the machine. As best seen in Fig. 5 the handle 29 comprises a spring tensioned push-rod adapted through the toggle link 32 to operate the bar 33 engageable with a lug 34 on the underside of the cover 30, so that when the push-rod 29 is moved inwardly with respect to the casing, the lug will be unlatched and the cover will rise under the urge of a spring which may be incorporated in the cover hinge 35 or otherwise provided as desired. Said cover carries an arm 36 the lower end of which is adapted to operate an electric switch not illustrated in detail but generally identified by the rectangle 37, since any appropriate well known switch may be employed, tne purpose of this construction being that when the cover 30 is raised, the electric switch will be moved by said arm to open the circuit of the electric current supplied as over the conductors indicated at 38 and 39 from a suitable source, and this switch 37 is a master or safety switch in that it controls all of the circuits of this machine. Reversely, when the cover 30 is closed, said switch will be moved reversely and thereupon close the main electric circuit.

Clothes cylinder and its support

The yieldable frame 10 is provided on one side of the machine with a pair of inclined A-legs such as 45 joined by a gusset plate 46, and on the other side of the machine with a duplicate pair of inclined A-legs such as 47 joined by a gusset plate 48, the two pairs of A-legs being so disposed on the machine that their upper extremities may provide bearings for a rock shaft 49 extending across the machine in substantially the vertical plane of the partition 3 separating the tubs 4 and 5 (see Figs. 3, 4 and 5), said rock shaft passing through the side walls of the receptacle 2. To an outer end of this rock shaft there is rigidly secured a segmental gear 50 carrying the cams 51, 52, 53 and 54 to be described in more detail later.

Said rock shaft 49, as best seen in Fig 5, has a more or less U-shaped central off-set 55, and within this U is secured a pin 56 disposed at right angles to the axis of said rock shaft and upon which is rotatably mounted a sleeve 57 rigidly carrying a bevel gear 58 in enmeshment with a bevel pinion 59 carried by the shaft 60 having a bearing in the hollowed section 61 on said rock shaft 49, the shaft 60 extending outwardly from the end of said rock shaft and carrying on its end a pulley 62 driven as by the belt 63 from a pulley 64 actuated by the electric motor 65 mounted upon the yieldable frame 10, the drive from this motor being illustrated in detail in Figs. 11, 12 and 13 and to be described later.

The sleeve 57 is rigidly secured to the center of the bottom of a cylinder 66 whose circular wall is provided with perforations 67, the top of said cylinder having a central charging opening 68 through which clothes may be placed in and abstracted from said cylinder. Therefore it is to be understood that, so long as the electric motor 65 is energized, the cylinder 66 will be rotated about the axis of said sleeve 57, and that the position of the cylinder may be changed from that shown in full lines in Fig. 4 to either of the positions shown in dotted lines at 69 and 70 by operation of the rock shaft 49.

Hence it will be seen that at the start of the laundering operations the clothes are admitted through the opened casing 25 into the cylinder 66 when said cylinder is at its uppermost position or that shown in full lines in Fig. 4. Upon closing the casing door 30 the master switch 37 closes the main electric circuit thereby making available electric current for the various operating circuits. Then the cylinder with its clothes may be rocked or tilted into the dotted line position shown at 69 in which position the clothes will be in the soak-rinse tub 4, and after suitable soaking of the clothes the cylinder may be rocked or tilted in a reverse direction and over into the dotted line position 70 in which position the clothes will be in the wash tub 5, and then after a suitable period of washing the cylinder may again be rocked to bring it once more into its position shown by the dotted lines 69 in which position the washed clothes will be subjected to a rinsing operation in tub 4, and then finally the cylinder may be rocked into its uppermost position or that shown in full lines 66 in which position the cylinder may be spun to extract most of the water from the rinsed clothes. Provision is also made for spinning the cylinder when it is in its uppermost position intermediate the soaking and washing positions, as well as intermediate the washing and rinsing positions, as will be brought out hereinafter.

*Rocking operation of clothes cylinder*

The means for rocking the cylinder comprises the reversible electric motor 71, carried by the yieldable frame 10, driving the belt 72, pulley 73, worm shaft 74, worm gear 75, and pinion 76 in enmeshment with the segmental gear 50, suitable switch mechanism to be described later being provided for starting and stopping the motor 71. A counterweight 77 is provided to balance the cylinder 66 (see Figs. 6 and 7).

The switch mechanism for stopping the reversible motor 71 comprises any well known three point switch such as that schematically illustrated in Fig. 23 and generally identified by the numeral 80 in Figs. 5, 14 and 15 and provided with a finger 81 extending therefrom through an aperture in a bar 82 vertically reciprocable in a guide plate 83 and carrying at its upper end a roller 84 disposed in the path of, and adapted to be actuated by, the cams 51, 52 and 53 carried by the segmental gear 50. The bar 82 has a close sliding fit in its guide 83 wherefore said bar will remain in the position to which it is moved by one of said cams and, as clearly shown in Fig. 4, the cam 52 is adapted to move said bar downwardly, whereas each of the cams 51 and 53 is adapted to move said bar upwardly. The cams 51, 52 and 53 are so positioned on the segmental gear 50 that they will cause cessation of tilting or rocking movement of said cylinder when the cylinder is in its dotted line position 70, in its full line position 66, and in its dotted line position 69, respectively (see Fig. 4). Auxiliary means are provided in the plural sets of spring contacts to be described later and illustrated in Figs. 19 to 24, for reenergizing the cylinder rocking motor 71 after it has been stopped by virtue of the action of any one of said cams.

*Rotation of clothes cylinder*

It was stated above that the electric motor 65 caused continuous revolution of the cylinder 66 about the axis of the cylinder supporting sleeve 57, this continuous revolution occurring from the time that the clothes enter the soak water in tub 4, to the time that the cylinder has completed the spinning action of the rinsed clothes to extract practically all of the rinse water therefrom, or in other words it may be said that the cylinder 66 is continuously rotated during the entire laundering operation of the machine. However, this continuous rotation is not always at the same revolutions per minute, it being desired to have the cylinder rotate at a faster speed when it is in its uppermost position or that shown in Fig. 8 in order to quickly expel by centrifugal action the water from the clothes after the cylinder has been rocked to raise the clothes out of the liquid in either of the tubs 4 or 5. Therefore means are provided for increasing the speed of revolution of the cylinder at such times, said means being particularly illustrated in Figs. 5, 11, 12 and 13.

Said speed changing means comprises a friction clutch having the two cone members 90 and 91, the former splined to the shaft 92 of the motor 65 and therefore slidable thereon and rotatable therewith at the full speed of said motor, said member 90 having a sleeve-like boss 93 provided with an annular groove 94 adapted to be engaged by diametric pins 95 carried by a fork 96 whose lowermost extremities are pivoted as at 97 to the yieldable frame 10, the upper end 98 of said fork adapted to be moved so as to cause said fork to turn about its pivot and thus cause disengagement of the two clutch members 90 and 91. The means for causing this pivotal movement is a finger 99 rigidly secured to a rock shaft 100 mounted in suitable bearings indicated in dotted lines in Fig. 12 at 101 and 102, said rock shaft having rigidly secured thereto an operating arm 103 the outer extremity of which engagingly receives the lower end of a link 104 the upper end of which is pivotally attached as at 105 to the cylinder rock shaft 49 or to the counterbalance 77 of the cylinder 66 (see Fig. 6), the pivotal connection 105 being slightly offset with respect to the axis of said cylinder rock shaft 49 and/or the cylinder rotating shaft 60, as should be perfectly clear from Fig. 6.

This offset or eccentricity is so calculated that when the cylinder 66 is in its uppermost or spinning position, the link 104 will be in its lowermost position, in which position the two clutch members 90 and 91 will be in tight engagement with each other by virtue of the heavy duty spring 106 interposed between the casing of the motor 65 and the movable clutch member 90, and this arrangement of parts is that which is illustrated in Fig. 11. When, however, the cylinder 66 is rocked so as to be positioned in either of the tubs 4 or 5, the rocking of the cylinder will cause the link 104 to be moved upwardly to the position as seen for example in Fig. 6, which movement actuates the operating arm 103 to cause the finger 99 to pivotally move the fork 96 and thereby disengage the clutch members 90 and 91, resulting in a reduction of the speed of rotation of the cylinder while in either of said tubs, as will now be described.

This reduction in speed of rotation may be brought about in any well known mechanical manner, but in Figs. 11 and 12 one means is illustrated for accomplishing this result. That is to say, the clutch member 91 is formed interiorly with annularly arranged teeth constituting a ring gear 110 in enmeshment with three pinions 111, 112 and 113 in symmetric relation to each other, said pinions rotatable upon stub shafts or pins such as 114 carried by a circular plate 115 attached to a sleeve 116 keyed to the inner end of shaft 117 coaxial with the motor shaft 92 and mounted in a suitable bearing 118, the outer end of said shaft 117 carrying the pulley 64, previously mentioned, for driving the cylinder rotating shaft 60. The three pinions 111, 112 and 113 are each in enmeshment with a small driving pinion 119 keyed to the motor shaft 92 and, together with the ring gear 110, form a well known type of planetary transmission.

Thus it will be understood that when the clutch members 90 and 91 are in engagement with each other, the planetary gearing will act unitarily and thus cause rotation of the shaft 117 at the same revolutions per minute as the motor shaft. However, when the clutch members are disengaged from each other the motor shaft, through its pinion 119, may cause the pinions 111, 112 and 113 to "walk around" the ring gear 110 especially if said ring gear is held against rotation, and thereby cause the back plate 115 to give a reduced speed of rotation to the shaft 117.

To hold the ring gear against rotation, there is provided a brake band 120 secured at its bottom mid-point to the yieldable frame 10 and having one of its free ends 121 freely receiving therethrough the rock shaft 100 (see Figs. 11 and 12), and having its other free end 122 provided with a cam member 123 mounted slidably on said rock shaft, said cam member coacting with a companion cam member 124 pinned to said rock shaft whereby, when the rock shaft is rocked by link 104 as previously described, the cam member 124 will operate upon its companion cam member 123 to move the two ends of the brake band together and thus apply a holding friction upon the exterior surface of the ring gear 110 preventing rotation thereof.

Automatic tub drain

The segmental gear 50 carries a cam 54 which is adapted to actuate a rocker cam 130 pivoted as at 131 to the gusset plate 46 (see Figs. 4, 14 and 15), said rocker cam having pivotal connection with the upper extremity of a link 132 the lower end of which is pivotally secured to the outer end of a lever 133 pivoted as at 134 to a bracket carried by the yieldable frame 10, the other end 135 of said lever adapted to operate a crank 136 secured to one end of a rock shaft 137 upon which is mounted a flap valve 138 normally covering the discharge end of the drain pipe 6 from tub 4, whereby said tub is drained automatically of its liquid content when the cylinder 66 has been tilted or rocked to bring the cam 54 into engagement with the rocker cam 130.

In Figs. 17 and 18 this flap valve is shown in detail as comprising a spring 139 exerting a pressure tending to move said valve into, and to keep said valve in, closed position. If found necessary the valve 138 may be attached by loose rivets 140 to ears such as 141 mounted upon the rock shaft 137 in order to insure proper seating of said valve upon the end of its drain pipe. Suitable bearings, not shown, are provided for said rock shaft, and the other end of said rock shaft may be provided with a castellated member 142 (or other device permitting lost motion) adapted to engage a companion and similarly formed castellated member 143 secured to the inner end of a second rock shaft 144, coaxial with the rock shaft 137, and having mounted thereon a flap valve 145 similar in all respects to the flap valve 138 but serving to close the discharge end of the drain pipe 7 from tub 5, the outer end of the rock shaft 144 having secured thereto a crank 146 adapted to be connected to and operated by a manually controlled means to be described later and for draining tub 5.

Rocking motor control

The rocker cam 130 controls a plunger 150 operating in a guide 151 against the tension of a spring 152 to operate a three-way switch generally identified by the numeral 153 (see Fig. 14), said switch controlling the energization of the cylinder rocking motor 71. A spring 154 (Figs. 14 and 15) serves to pull the link 132 downwardly to maintain contact between the rocker cam 130 and the plunger 150. However, it is to be understood that the tensions of the springs 152 and 154 are such that normally the parts are positioned as illustrated in Figs. 14 and 15, i. e. the movable member of the switch 153 is in its uppermost position and will remain there until cam 54 has contacted the bulbous or arcuate end of, and caused clockwise pivotal movement of, the rocker cam 130, thereby depressing the plunger 150, moving the said switch member to its lowermost position, raising link 132, and thereby depressing the end 135 of the drain valve operating lever 133 to open said valve. In other words, the movable member of switch 153 is always in its uppermost position except when cam 54 is actuating said rocker cam 130, and this exception exists only in the drain-and-second-rinse stage of the washing operations.

Control panel board

The panel board 28 mounted on the front of the casing 25 of this machine is illustrated somewhat diagrammatically in Fig. 16 as comprising a control 160 for the starting and stopping of the machine, including means for varying the time intervals that may be allotted to phases of the laundering of the clothes, as well as comprising a mixing valve 161 for water admitted to tub 4, another mixing valve 162 for water admitted to tub 5, and a handle 163 rotatably mounted for manually controlling the draining of the tubs as well as the cleaning thereof after the laundering is completed. Each of the mixing valves receives hot water as from the piping 164, as well as cold water as from the piping 165, the mixture of these waters at the desired temperature passing as by pipes 19 to either of the float-valve boxes 15 and 16 and through them to the respective tubs 4 and 5. Such mixing valves are well known and need no further explanation.

Manual control of water

The manually rotatable handle is secured to a cam 166 which in its revolution actuates a spring tensioned push-rod 167 pivotally connected to a bell crank 168 pivoted as at 169 to a part of the framework, said bell crank actuating a link 170 secured to the end of the crank 146 associated with the valve 145 of the drain pipe 7 from tub 5, whereby initial actuation of said push-rod downwardly will open said drain valve 145, and further downward movement thereof will open valve 138 of drain pipe 6 of tub 4 through the medium of the castellated members 143 and 142 carried by the rock shafts 144 and 137 of said respective valves.

The hot water pipe 164 has a lateral branch 175 communicating with the bottom of a valve chamber 176 having therein the spring pressed valve 177 provided with a valve stem 178 projecting upwardly out of said valve chamber and adapted to be contacted and actuated by an arm 179 rigidly carried by the push-rod 167, said valve 177 being interposed between the intake pipe 175 and an outlet pipe 180 leading to the spray nozzles such as 23 for the tubs 4 and 5.

The arm 179 is located on the push-rod so as not to open valve 177 until after the drain valves of the tubs have been at least partly opened, in order that the hot water from pipe 180 through the spray nozzles will serve to flush, rinse and clean the tubs. Rotation of the handle 163 in a reverse direction will of course permit upward movement of the spring tensioned push-rod 167, thereby first cutting off flow of the flushing or cleaning water through the spray nozzles, and then closing the drain valves associated with the tubs.

Control of washing operations

The control 160 carried by the panel board 28 may be of various designs, but one mechanism is schematically illustrated in Figs. 19 to 22 except for a clock motor for actuating a shaft to which is secured a cam disk 185, and for such a clock motor it is preferred to employ an electric clock of the self-starting type, well known on the market. The shaft of such motor is indicated at 186 and carries, in addition to the cam disk 185, an indicator 187 operable by the operator of the machine. A stationary support, indicated in the drawing by the disk 188 and through which the motor shaft may freely pass, carries a pivot 189 for one end of a handle 190 by which the aforementioned time intervals may be varied.

Relatively loosely mounted on the clock shaft, are three sector plates 191, 192 and 193, plate 191 having projecting therefrom the two sets 194 and 195 of similar plural electric circuit closing contacts, each set substantially of the type and form illustrated in Fig. 24, and the plate 192 having projecting therefrom the five sets 196, 197, 198, 199 and 200 of similar plural electric circuit closing contacts, like the sets 194 and 195.

The sector plate 192 is pivotally connected to the handle 190 by a link 201, and the sector plate 191 is pivotally connected to the said handle by a link 202, but these two links are attached to the handle at points which are differently spaced from the handle pivot 189 on the stationary disk 188, whereby a throw of the handle 190 will cause the sector plates 191 and 192 to be moved toward or away from each other, as well as cause the sector plate 191 to move toward or away from another set 203 of plural electric circuit closing contacts similar to the sets previously mentioned, but the set 203 is carried by a stationary part of the control mechanism and therefore is fixed as contra-distinguished from the shiftable sets carried by the sector plates 191 and 192.

Each of these sets of electric circuit closing contacts comprises, for the apparatus hereinbefore described, a base 210 (see Fig. 24) which may be a stationary fixture of the control mechanism in connection with the set 203, or may be the sector plate 191 in connection with the sets 194 and 195, or may be the sector plate 192 in connection with the sets 196, 197, 198, 199 and 200, and to such base are secured six leaf spring current conveying members 211, 212, 213, 214, 215 and 216 in parallel relation with each other but separated by blocks of electrical insulation such as 217 between each two thereof, a current conveying wire being joined to each of such members. Three pairs of said members are provided, as will be seen from the wiring diagram Fig. 23, because the motor 71 is of the reversing type.

Insulation separators such as 218 and 219 secure together the free ends respectively of the members 212 and 213 as one pair, and the members 214 and 215 as another pair, and all of the six members have contact points such as 220 and 221 facing each other in the three pairs of the members as illustrated, said contact points being of a length to provide a small air gap therebetween in the normal open positions of said members, which gap is adapted to be closed by the flexing of these spring members as when the projection 222 of the cam disk 185 engages the end 223 of an outside member of each set, said projection 222 being of such arcuate dimension as to give a duration of closing of the contact members in each set (as the cam disk is rotated) sufficient to energize the cylinder rocking motor 71 and to accomplish the rocking of the cylinder from one to another of its positions. In Fig. 19 the cam projection 222 is shown in position closing all of the contacts of set 203, whereas the dotted line representations of the other sets of contacts shows the individual contact points of each set open, and it is to be understood that said projection is the only means for closing the contacts in any set. The purpose of each set of contacts is to make possible the energization and actuation of the cylinder rocking motor 71.

Means for starting and stopping the cylinder rotating motor 65, and for starting and stopping the electric clock motor, are illustrated in Figs. 19, 22 and 23 but it is to be understood that other means may be employed than that schematically shown in these figures of drawings. Such means as shown comprises a pivoted disk, button or other member 225 preferably circular and provided on its periphery with two projections 226 and 227, which member is pivotally mounted upon a portion of the control device which is rotated by the electric clock motor so that the member may travel for example from the position shown in Fig. 19 around to the position shown in Fig. 22, wherefore it could be mounted on a counterpart 228 of the indicator 187. A face of this disk 225 has secured thereto an electrical contact point 229 adapted to make and break contact with a companion and similar contact point 230 carried by said counterpart 228, said contact points being in the circuit of the motor 65 and the clock.

A pin 231 is carried by a stationary part 232 of the clock motor, which pin is positioned so as to be struck by the projection 227 of the disk 225 when the latter is moved around the clock axis 186. A similar pin 233 is mounted on a face of sector plate 193, said pin positioned to be struck by the other projection 226 of the disk 225 as the latter moves around the clock axis 186.

Therefore it will be understood that when the indicator 187 is moved to the "start" position shown in Fig. 19, the pin 231 will have caused a pivotal movement of the disk or button 225 to close the contacts 229 and 230 thereby supplying electric current to the cylinder rotating motor 65 and the electric clock, causing both to start operating. Annular rings 234 and 235 (see Fig. 23) may be provided with suitable current take-off brushes as well understood for supplying current to the contacts 229 and 230. At the end of the laundering operations, i. e. after suitable spinning of the rinsed clothes, the indicator 187 will have been moved substantially to a diametric position, equivalent to that of its counterpart 228 shown in Fig. 22, and at the end of such movement the pin 233 will have caused a pivotal movement of the disk or button 225 to open the contacts 229 and 230 thereby breaking the circuit through said motor 65 and the electric clock, and stopping the machine.

It may be found desirable to vary the time interval allotted to this final spinning of the rinsed clothes, as for example due to the quantity and/or nature of the clothes, and therefore means are provided for giving relative movement between sector plates 192 and 193, the former carrying the final set of contacts 200, and the latter carrying the pin 233 adapted to stop the spinning of the rinsed clothes. Such a means is illustrated in Figs. 19 to 21 as comprising an arcuate slot 240 formed in sector plate 193, said slot having teeth on one side constituting a rack 241. A pinion 242 in enmeshment with said rack is mounted upon a stem 243 having on its outer end a handle or knurled knob 244 for actuating said pinion whereby when the pinion is manually rotated the sector plate 193 is moved relative to sector plate 192. A window 245 may be provided in sector plate 192 and a similar window 246 may be provided in sector plate 193, said windows adapted to register with suitable legends (as indicated in Fig. 19) for assisting in the manual adjustability of these plates with respect to phases of the laundering.

Operation of machine

From what has been heretofore described it will be understood that the operation of this machine is as follows. The cover of the casing is raised thereby opening master switch 37, and dirty clothes are charged into the cylinder 66 which is in its uppermost position as seen in Fig. 4, and then the cover is closed thereby closing said master switch, it being understood that in the meantime water has been admitted to tubs 4 and 5 by manipulation of the mixing valves 161 and 162, and a suitable cleansing agent (soap) has been added to the water in tub 5. With said cylinder in said uppermost position, cam 52 on segmental gear 50 has moved bar 82 downwardly to permit energization of circuit B through switch 80 (see Fig. 23). The handle 190, and/or the knob 244, are then manipulated to obtain the desired allotment of time for the various laundering phases, and then the indicator 187 is moved around to the "start" position or that shown in Fig. 19, which movement causes the closing of contacts 229 and 230 on disk or button 225 and starts actuation of the electric clock and the cylinder rotating motor 65, as will be understood by reference to Fig. 23. This movement of the indicator also brings projection 222 of cam disk 185 into position to close the set 203 of electrical contacts, and thereafter both the cam disk and the indicator are conjointly and simultaneously rotated by the electric clock. Closing of the contacts in set 203 causes energization and actuation of the cylinder tilting motor 71 to give counterclockwise tilt or movement to said cylinder so that it will travel from its uppermost position (where it is charged with the dirty clothes) to a position in tub 4 as indicated at 69 in Fig. 4. Such energization of tilting motor 71 is brought about by a circuit from the positive power lead, through the upper connections of switch 153, lower connections of switch 80, over circuit B to the outermost and central pairs of contacts of set 203, and thence over wires 300 and 301 respectively to said motor. The circuit for the negative potential for such energization is established by wire 303 from motor 71, through the closed innermost pair of contacts of set 203, and wire 310 to the negative return bus 302. Therefore it will be understood that at this point of the operations the cylinder is moving toward its dotted line position shown at 69 in Fig. 4 for subjecting the clothes to a soaking action in tub 4.

As said cylinder nears the dotted line position 69, the cam 53 of its segmental gear 50 engages roller 84 and raises bar 82 causing a throwing of switch 80 and a breaking of the circuit through the tilting motor 71. The clothes are subjected to this soaking operation for a period of time governed by the arcuate distance between the sets 203 and 194 of electric contacts.

At the termination of the soaking period, the cam disk 185 will have been rotated by the clock motor to bring the projection 222 into position to close the contacts in set 194 and thereby again energize and actuate the tilting motor 71 but in a reverse direction. The circuit for this energization of said motor is from the positive power lead through the upper connections of switch 153 and the upper connections of switch 80, over the C wire to the outermost and central pairs of contacts of set 194, thence by wires 300 and 303 to said motor. The circuit for the negative potential for such energization is established by wire 301 from motor 71, through the closed innermost pair of contacts of set 194, and wire 310 to the negative return bus 302. Such actuation of the motor being reversely to that previously given it, the cylinder will be caused to be rocked or tilted out of the soak water in tub 4 and up to its uppermost position, the cam 52 of the segmental gear 50 then coming into play to throw switch 80 and again cause cessation of operation of said motor 71.

The cylinder remains in this uppermost position for a duration of time in accordance with the arcuate spacing between sets 194 and 195 of the circuit closing contacts, and sufficient for the axial rotation of said cylinder at the increased speed of rotation imparted thereto by motor 65 through the instrumentality of the planetary transmission control, such increased speed of rotation serving by centrifugal action to expel the larger portion of the soak water from the clothes, the water thus expelled being thrown through the perforations of said cylinder against the inner surfaces of the upper portion of receptacle 2 and falling into the annular trough 250 secured to said surfaces, and escaping from said trough as by the piping 251 to the drain collector 8 (see Figs. 3, 4 and 5).

After such spinning of the soaked clothes, the cam disk 185 will have been rotated to cause the closing of the contacts in set 195, again energizing and actuating the cylinder rocking motor 71 but in the same direction of rotation as evidenced by the wiring diagram Fig. 23. The circuit for such energization is from the positive power lead through the upper connections of switch 153 and the lower connections of the switch 80, over wire B and thence by wire 304 to the outermost and central pairs of contacts of set 195 and thence by wires 300 and 303 respectively to said motor. The circuit for the negative potential for such energization is established by wire 301 from motor 71, through the closed innermost pair of contacts of set 195, and wire 310 to the negative return bus 302. This actuation of said motor results in a tilting of the cylinder down into the soapy wash water in tub 5 or into that position shown in dotted lines at 70 in Fig. 4, the cylinder rotating motor 65 through the planetary transmission having its effective speed of rotation reduced while the clothes are being churned in the wash water. In this tilting of the cylinder the cam 51 of the segmental gear 50 comes into operation and actuates the switch 80 to break the circuit of the tilting motor 71 just prior to the cylinder reaching its position 70, whereby the tilting is stopped.

At the end of the washing period, the cam disk 185 will have been rotated to cause a closing of the contacts in the set 196, thereby energizing and actuating motor 71 but in the reverse direction, the circuit for such energization being from the positive power lead through the upper connections of switches 153 and 80, over wire C, over bus 305 to the outermost and central pairs of contacts of set 196, thence over wires 300, 307 and 301 to said motor. The circuit for the negative potential for such energization is established by wire 303 from motor 71, over bus 308, through the closed innermost pair of contacts of set 196, over bus 311 and wire 310 to the negative return bus 302. This actuation of said motor causes a tilting of the cylinder out of the wash water up to its uppermost position, such tilting again being stopped by gear cam 52 throwing the switch 80. In this uppermost position the cylinder is again spun at increased revolution to expel the soapy water from the clothes, the expelled water being caught and drained by the trough 250 as hereinabove explained. This spinning operation is of relatively short duration also, and governed by the spacing of sets 196 and 197 of the electric contacts.

After such spinning of the washed clothes the cam disk 185 will have caused a closing of the contacts in set 197 and again energized motor 71 for actuation in the same direction, such energization comprising the circuit from the positive power lead through the upper connections of switch 153 and the lower connections of switch 80, over wire B and bus 306 to the outermost and central pairs of contacts of set 197, thence over wire 300, bus 307, and wire 301 to said motor. The circuit for the negative potential for such energization is established by wire 303 from motor 71, over bus 308, through the closed innermost pair of contacts of set 197, over bus 311 and wire 310 to the negative return bus 302. This actuation of said motor results in a tilting of the cylinder over into tub 4 for rinsing of the clothes, the tilting of the cylinder in this direction being stopped by the throw of the switch 80 when cam 53 of the gear 50 comes into contact with and operates the switch-throwing rod 82, the speed of rotation of the cylinder again being reduced during this movement of the cylinder. The clothes are churned in the rinse water of tub 4 for a period of time governed by the spacing between sets 197 and 198 of the electric contacts.

When the cam disk 185 causes the closing of the contacts of set 198, the motor 71 is again energized for actuation in the same direction, said energization comprising the circuit from the positive power lead through the upper connections of switches 153 and 80, over wire C, thence by bus 305 to the outermost and central pairs of contacts of set 198, thence over wire 300, bus 307 and wire 301 to said motor. The circuit for the negative potential for such energization is established by wire 303 from motor 71, over bus 308, through the closed innermost pair of contacts of set 198, over bus 311 and wire 310 to the negative return bus 302. This actuation of said motor causes a tilting of the cylinder a little farther on or into the dotted line position 252 shown in Fig. 6 in order to cause cam 54 of the gear 50 to actuate the rocker cam 130 (see Figs. 4, 14 and 15) and thus cause the opening of the valve 138 of drain pipe 6 of tub 4 containing the rinse water and almost simultaneously causing downward actuation of switch 153 to break the circuit of motor 71 to stop said motor and the cylinder in said position 252. As the rinse water flows rapidly out of tub 4 the liquid level thereof falls and thus causes an inflow of fresh water by virtue of the float valve control, the fresh rinse water being injected as from nozzle 23 through the charging opening of the cylinder onto the clothes being churned by the revolution of said cylinder, this constituting a second rinse with absolutely clear water as contradistinguished from the first rinse of the soapy clothes in the full tub of rinse water.

The continued rotation of cam disk 185 then causes a closing of the contacts in set 199, again energizing motor 71 but for actuation in a reverse direction, the circuit for such energization being from the positive power lead through the lower connections of switch 153, over wire D to the outermost and central pairs of contacts of set 199, and then by wire 300, bus 308 and wire 303 to said motor. The circuit for the negative potential for such energization is established by wire 301 from motor 71, over bus 307, through the closed innermost pair of contacts of set 199, over bus 311 and wire 310 to the negative return bus 302. Hence this actuation of the motor causes a tilting of the cylinder from its position 252 in Fig. 6 to its position 69 shown in Fig. 4, but as soon as cam 54 of gear 50 leaves the rocker cam 130, spring 152 forces bar 150 upwardly thereby reversing switch 153 to open the circuit to and thereby stop the actuation of said motor, so that the clothes may be churned in tub 4 in fresh water that has in the meantime filled said tub after closing of the drain valve thereof due to disengagement of cam 54 with rocker cam 130. That is to say, so long as the drain valve is open, the water level in tub 4 falls and opens the inlet valve 20 by action of the float 21, but upon disengagement of cam 54 with said rocker cam 130 the drain valve closes by spring action, and the water admitted to said tub (and float box 15) will not escape through said drain but will rise in said tub and box, elevating said float and eventually closing the inlet valve 20 when said tub is filled. This constitutes a third rinse of the clothes which continues for a duration of time governed by the spacing of the sets 199 and 200 of the electric contacts.

The continued revolution of cam disk 185 causes a closing of the contacts in set 200, again energizing motor 71 for actuation in the same direction, the circuit for such energization being from the positive power lead through the upper connection of both switches 153 and 80, over the C wire, thence by bus 305 to the outermost and central pairs of contacts of set 200, thence over wire 300 to said motor as well as over wire 309, bus 308 and wire 303 to said motor. The circuit for the negative potential for such energization is established by wire 301 from motor 71, over bus 307 and wire 312, through the closed innermost pair of contacts of set 200, over bus 311 and wire 310 to the negative return bus 302. This actuation of said motor causes a tilting of the cylinder from its position 69 (Fig. 4) to its uppermost position in order to bring the thoroughly rinsed clothes out of tub 4 into the elevated position where they are rapidly spun by the motor 65 for extraction of the rising water. However, as the cylinder nears its uppermost position, cam 52 of segmental gear 50 will come into position to move bar 82 of switch 80 downwardly, thereby reversing said switch to break the circuit to, and thereby stop actuation of, the tilting motor, causing said cylinder to stop and remain in its uppermost position for said extraction, by spinning, of the rinsing water.

This final spinning of the clothes is carried on for a duration of time in accordance with the quantity and nature of the clothes and is governed by the adjusted position of pin 233 (Figs. 19 and 22) with reference to set 200 of the electric contacts because, when the cam 225 reaches said pin and is pivotally rotated thereby, the contacts 229 and 230 are separated thus breaking the circuit of the electric clock motor as well as the circuit of the cylinder rotating motor 65, thereby bringing the machine to a stop. A new batch of clothes may then be washed by the machine either using the original soapy water and the last rinse water, or these waters may be drained from their tubs by manual manipulation of the handle 163 (Fig. 16) as heretofore described and fresh waters substituted, the second batch of clothes being subjected to washing operations which are duplicates of those just explained.

*Alternate construction and operation*

All of the foregoing description has been with respect to the utilization of two electric motors, one for rotating the cylinder and the other for tilting the cylinder, the motor for tilting the cylinder being of the reversible type necessitating many electric contacts and wiring as per the diagram of Fig. 23. A simplified construction constituting a modification of this invention, and wherein only one electric motor is necessary with corresponding simplification of contacts and wiring, is illustrated in Figs. 25, 26 and 27 which correspond generally to Figs. 14, 15 and 23 respectively.

That is to say, there is provided the single electric motor 260 adapted to rotate only in one direction and one end of whose shaft 261 is extended and disposed between upper and lower cone plates 262 and 263 of an electrically controlled clutch, the upper plate 262 mounted upon the shaft 264 provided with the worm 265 in engagement with the worm gear 266 which is the counterpart of worm gear 75 for tilting the cylinder through the intermediary of the segmental gear 50. The other end of said motor shaft may have the heretofore described driving connections for causing the rotation of the cylinder.

Splined on the motor shaft 261 for sliding movement thereon, is a pair of spring tensioned small cones 267 and 268, one on either side of the cone plate 262, and adapted to be alternately slid on said shaft into the space between the cone plates 262 and 263 for driving connection therewith. An electric solenoid generally identified by the numeral 269 is carried by the frame 10 of the machine, the core of which solenoid is pivotally connected as at 270 to a lever 271 the lower end of which is pivotally supported as at 272 to said frame, the upper end thereof carrying a roller 273, or other device, for slidably moving the small cone 267 into engagement with the cone plate 262. Thus it will be understood that when the solenoid 269 is energized, its core will be drawn inwardly and thus cause engagement of the cones 267 and 262 thereby causing the cylinder to be tilted in one direction.

A duplication of this solenoid control is provided for moving the other small cone 268 into engagement with cone plate 262 but this duplicate solenoid control is of course diametrically opposed to the one just previously described wherefore when the duplicate solenoid 274 is energized the cylinder will be tilted in the opposite direction. These solenoids are in turn controlled through the switches 80 and 153 previously described as well as by somewhat similar electric contacts, but there is only necessary one pair of electric contacts at each energizing station instead of the set of contacts shown in Fig. 23. The start and stop of the motor 260 may be controlled in the same manner as described for motor 65.

It is obvious that those skilled in the art may vary the details of construction and arrangements of parts without departing from the spirit of this invention, wherefore it is desired not to be limited to the exact foregoing disclosure except as may be required by the claims.

What is claimed is:

1. In a cleaning apparatus comprising two adjacent tubs, a cylinder adapted to contain the articles to be cleaned and supported by an oscillatable member disposed between the tubs, and means for continuously rotating the cylinder at one speed while the cylinder is positioned in a tub for washing or rinsing operations and at a higher speed for extracting liquid from the articles when the cylinder is at a position out of the tub, the combination of a reversible motor for rocking the rotating cylinder on its oscillatable support alternately from one to another of said tubs; cam means for stopping said motor to create a pause of the rocking movement of the cylinder when the cylinder is in each of the tubs, said cam means being operatively connected to the cylinder support and comprising an electric switch governing said motor, said cams being disposed to sequentially actuate said switch in the rocking movement of said cylinder; a clock and cam means controlled thereby for starting said motor after such pause of the cylinder; and means carried by said clock for varying the duration of such pause.

2. In a cleaning apparatus comprising two adjacent tubs, a cylinder adapted to contain the articles to be cleaned and supported by an oscillatable member disposed between the tubs, and means for continuously rotating the cylinder, the combination of a reversible motor for rocking the rotating cylinder on its oscillatable support alternately from one to another of said tubs; cam means for stopping said motor to create a pause of the rocking movement of the cylinder when the cylinder is in each of the tubs, said cam means being operatively connected to the cylinder support and comprising an electric switch governing said motor, said cams being disposed to sequentially actuate said switch in the rocking movement of said cylinder; a clock and cam means controlled thereby for starting said motor after such pause of the cylinder; and means for draining one of said tubs, comprising one of said first named cam means operating to create an additional pause of the cylinder in that tub.

3. In a washing machine comprising two adjacent tubs, one tub for containing a predetermined quantity of a liquid suitable for soaking and rinsing clothes, the other tub for containing a predetermined quantity of a liquid suitable for washing the clothes, a perforated cylinder adapted to contain the clothes and supported by an oscillatable member disposed between the tubs, and means for continuously rotating the cylinder at one speed while the cylinder is positioned in a tub for washing or rinsing operations and at a higher speed for extracting liquid from the clothes when the cylinder is at a position out of the tub, the combination of means for rocking the rotating cylinder on its oscillatable support alternately from one to another of said tubs, said means including a clock and means controlled thereby for starting the rocking means after a pause of the cylinder; cam means operatively connected to the cylinder support for stopping the rocking means to create a pause of the rotating cylinder in the liquid of each of said tubs for a duration of time sufficient to accomplish the cleansing action incident to the tub, as well as to create a pause of the rotating cylinder in a position intermediate said tubs and out of the liquids thereof for a duration of time sufficient to expel by centrifugal action a considerable portion of the liquid carried by the clothes to such intermediate position; and collecting means within said tubs for receiving the liquid so expelled and draining it from the machine.

4. In an automatically operated cleaning machine provided with two tubs for containing different cleaning liquids, and a container for the articles to be cleaned, the combination of means for moving the container from one to another of the tubs, said means comprising an electric motor with drive connections to said container, a clock motor, a cam continuously actuated by said clock motor, and a plurality of sets of electric current contacts adapted to be closed by said cam for energizing said electric motor; means for interrupting the operation of the container moving means, to impart a pause of the container in each tub, said interrupting means comprising a switch for opening the circuit of said electric motor, and cams carried by a member connected to and movable with said container for operating said switch; and means for starting and stopping the machine, comprising two juxtaposed electric current contacts movable bodily about the axis of and by said clock motor, one of said contacts carried by a pivotally mounted button and movable toward and away from its companion contact upon pivotal movement of said button imparted thereto by members disposed in the path thereof.

5. In a cleaning apparatus comprising two adjacent tubs, a cylinder adapted to contain the articles to be cleaned and supported by an oscillatable member disposed between the tubs, and continuously driven means for rotating the cylinder at one speed while the cylinder is positioned in a tub for washing or rinsing operations and at a higher speed for extracting liquid from the articles when the cylinder is at a position out of the tub, the combination of a motor for rocking the rotating cylinder on its oscillatable support alternately from one to another of said tubs; means for affecting said motor to create a pause of the rocking movement of the cylinder when the cylinder is in each of the tubs, said means comprising a plurality of cams operatively connected to the cylinder support and further comprising an electric switch actuated by said cams and controlling the drive of said motor, said cams being disposed to sequentially actuate said switch in the rocking movement of said cylinder; a clock and cam means controlled thereby for rendering said motor operatively effective for cylinder rocking movement after such pause of the cylinder; and means for varying the duration of such pause.

6. In a cleaning apparatus comprising two adjacent tubs, a cylinder adapted to contain the articles to be cleaned and supported by an oscillatable member disposed between the tubs, and means for continuously rotating the cylinder at one speed while the cylinder is positioned in a tub for washing or rinsing operations and at a higher speed for extracting liquid from the articles when the cylinder is at a position out of the tub, the combination of a reversible motor for rocking the rotating cylinder on its oscillatable support alternately from one to another of said tubs; cam means for stopping said motor to create a pause of the rocking movement of the cylinder when the cylinder is in each of the tubs, said cam means being operatively connected to the cylinder support and comprising an electric switch governing said motor, said cams being disposed to sequentially actuate said switch in the rocking movement of said cylinder; a clock and cam means controlled thereby for starting said motor after such pause of the cylinder; and means for varying the duration of such pause, comprising a plurality of manually shiftable members mounted upon a common pivot and interlinked adjustably with each other, each member carrying normally open electric contacts adapted to be closed by the movement of said clock controlled cam means, said contacts controlling the energization of the cylinder rocking motor at timed intervals in accordance with the adjusted position of said members.

ALBERT R. MILLER.

REFERENCES CITED

The following references are of record in the file of this patent:

UNITED STATES PATENTS

| Number | Name | Date |
| --- | --- | --- |
| 504,246 | Reeve | Aug. 29, 1893 |
| 1,332,257 | Hendrickson | Mar. 2, 1920 |
| 1,492,033 | Herbert | Apr. 29, 1924 |
| 1,581,905 | Xardell | Apr. 20, 1926 |
| 1,622,543 | Rynders | Mar. 29, 1927 |
| 1,678,120 | Klutts | July 24, 1928 |
| 1,709,774 | Clarke | Apr. 16, 1929 |
| 1,747,620 | Clarke | Feb. 18, 1930 |
| 1,772,207 | Clarke | Aug. 5, 1930 |
| 1,892,441 | Wales et al. | June 30, 1942 |
| 2,195,123 | Pabst | Mar. 26, 1940 |
| 2,225,407 | Bassett | Dec. 17, 1940 |
| 2,236,748 | Chayie | Apr. 1, 1941 |
| 2,255,028 | Long | Sept. 2, 1941 |
| 2,288,141 | Oliver | June 30, 1942 |
| 2,328,026 | Moore | Aug. 31, 1943 |
| 2,391,718 | Lindemann | Dec. 12, 1945 |

FOREIGN PATENTS

| Number | Country | Date |
| --- | --- | --- |
| 57,334 | Sweden | Aug. 8, 1924 |
| 262,114 | England | 1927 |
| 277,666 | England | 1928 |
| 149,373 | Switzerland | Nov. 16, 1931 |